Sept. 6, 1949.　　　　J. C. AUTEN　　　　2,481,465
TRANSMISSION CONTROL
Filed June 27, 1946　　　　　　　　　　2 Sheets-Sheet 1
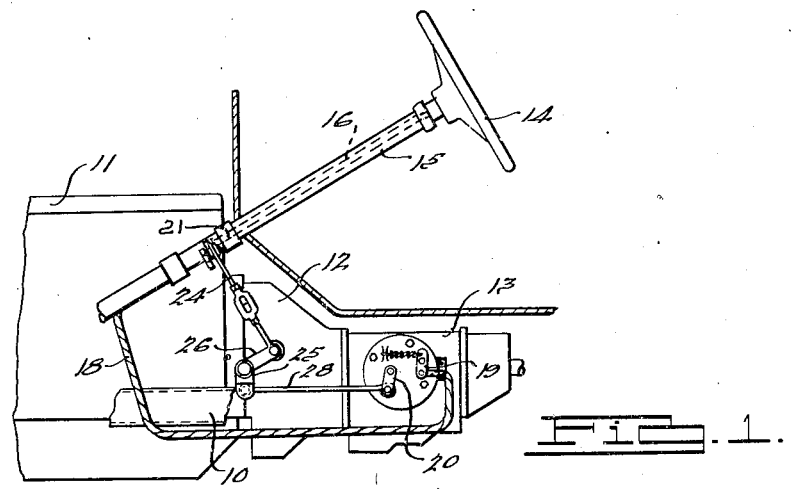
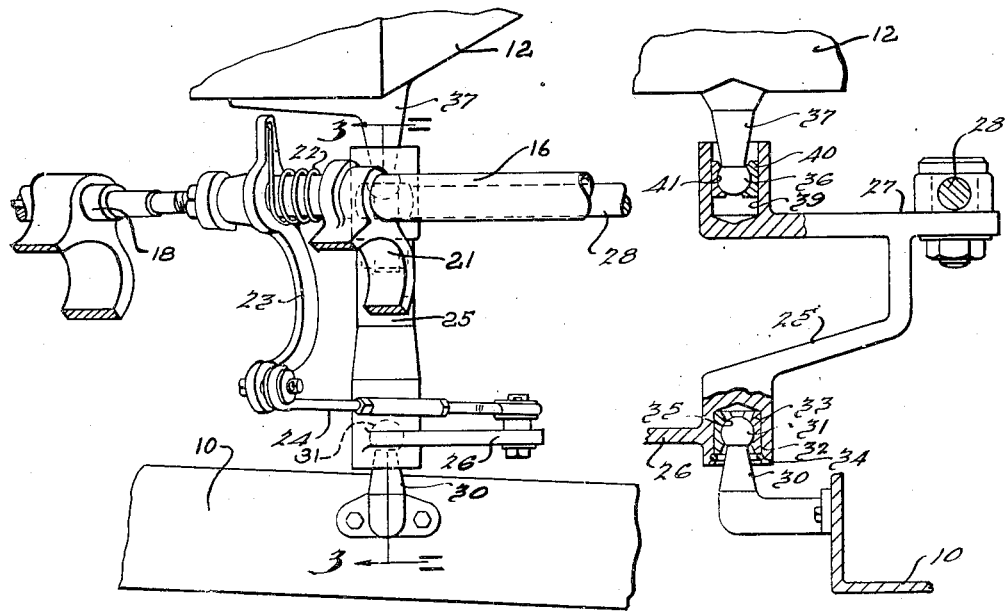
INVENTOR.
Jay C. Auten.
BY
Harness and Harris
ATTORNEYS.

Sept. 6, 1949. J. C. AUTEN 2,481,465
TRANSMISSION CONTROL
Filed June 27, 1946 2 Sheets-Sheet 2
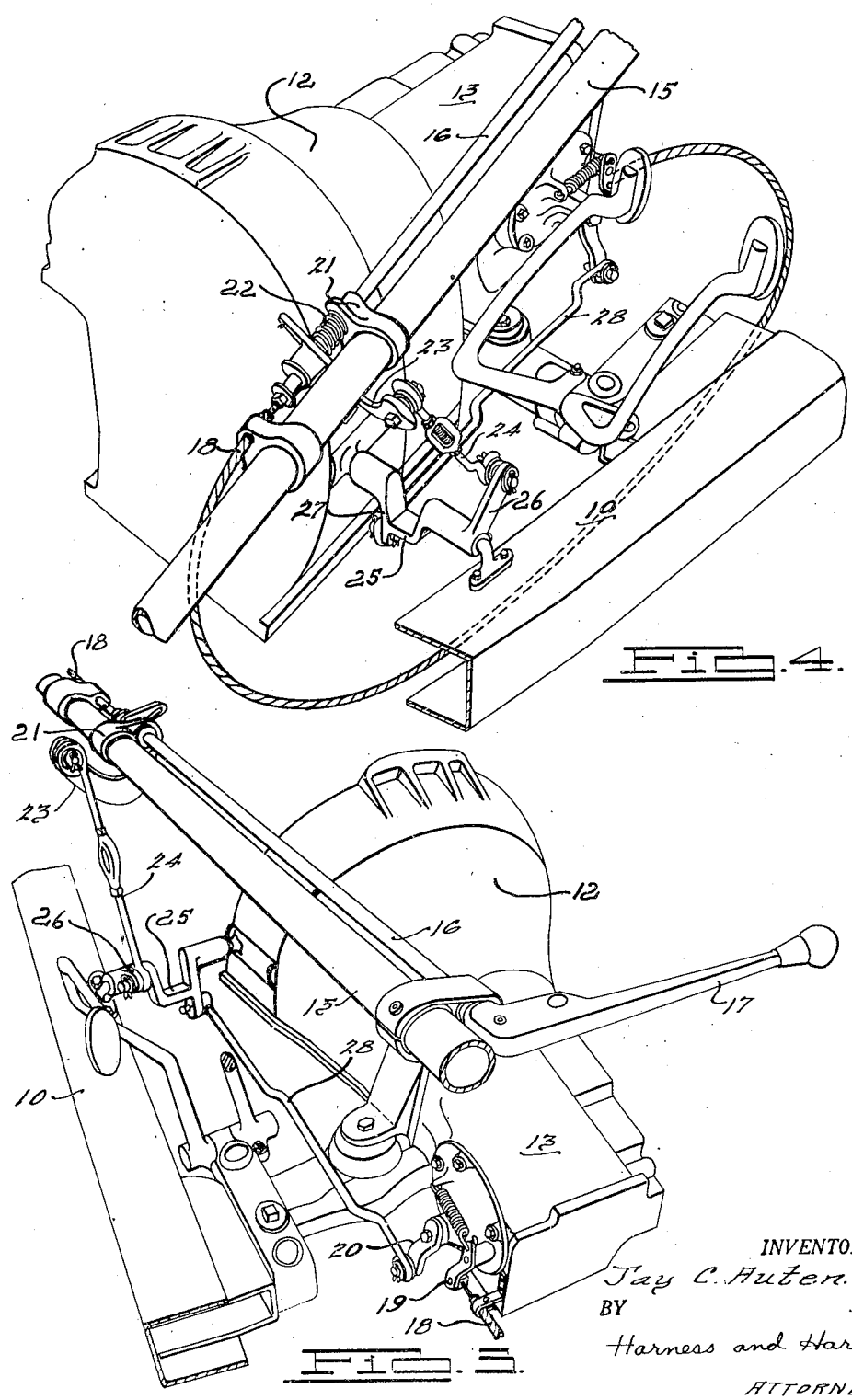
INVENTOR.
Jay C. Auten.
BY
Harness and Harris
ATTORNEYS

Patented Sept. 6, 1949

2,481,465

UNITED STATES PATENT OFFICE 2,481,465

TRANSMISSION CONTROL

Jay C. Auten, Royal Oak, Mich., assignor to Chrysler Corporation, Highland Park, Mich., a corporation of Delaware Application June 27, 1946, Serial No. 679,757

3 Claims. (Cl. 74—473)

This invention relates to improved shift control linkage for motor vehicles and more particularly it pertains to shift control linkage for controlling the variable speed ratio drive of a motor vehicle transmission which has an appreciable vibratory movement relative to the frame of the vehicle.

It has become customary to mount the power plant of a motor vehicle on the frame thereof by means of resilient mountings which allow the power plant to have considerable vibratory movement relative to the vehicle frame. It is also customary to provide a manual remote control shift control lever rotatably mounted within the operator's compartment of the vehicle and to operatively connect this lever with the transmission so that rotation of the lever will effect a change in the transmission speed ratio drive. It is desirable to mount this lever on the vehicle body and frame so that it will not move relative to the driver with engine vibration. It is also desirable to provide linkage that will actuate the transmission in response to driver control but will not transmit transmission vibration up to the control lever.

The linkage employed herein for this purpose comprises a rotatable shaft positioned transversely of the frame on one side thereof and having oppositely extending crank arms at its respectively opposite ends. One of the crank arms is connected to the transmission control element by a compression rod and the other crank arm is connected to the shift control lever through a link and rotatable rod. The above shaft is preferably mounted on ball joints.

It is an object of my invention to provide a control mechanism which will transmit the voluntary motions imparted thereto by the vehicle driver but will not transmit involuntary movements of the transmission back through the mechanism.

In the drawings:

Fig. 1 is a side elevational view of a typical power plant and steering wheel installation for a motor vehicle showing my invention applied thereto;

Fig. 2 is a perspective view of the rotatable shaft and adjacent linkage;

Fig. 3 is a partial section on the line 3—3 of Fig. 2;

Fig. 4 is a perspective view of a transmission and the control mechanism;

Fig. 5 is a perspective view of the same transmission and control mechanism taken from the rear of Fig. 4.

In Fig. 1 the usual vehicle frame 10 is illustrated as having mounted therein a power plant comprising an engine 11, clutch 12, and any type of transmission 13 which is adapted to be manipulated at least in part by the vehicle driver. As is customary in the art the power plant is suspended in the frame 10 by flexible mountings (not shown) which permit considerable relative movement to occur between the power plant and frame. This movement may be in a vertical direction, longitudinal direction or lateral direction or may consist of a rotation of the power plant about an axis or may be a combination of any or all of these motions.

A conventional steering wheel 14 is mounted on a steering post 15. The post 15 has its axis inclined forwardly and downwardly from the steering wheel 14. A main shift control rod 16 extends longitudinally adjacent the post 15 and has a shift control lever 17 mounted on the upper end thereof. The rod 16 is adapted to be rotated and reciprocated in response to movement of lever 17. Reciprocation of rod 16 is transmitted through any suitable operating connection, such as the Bowden wire 18, to the transmission selector lever 19. When rod 16 is rotated about its axis such motion is transmitted through my novel mechanism to the transmission lever 20 thereby to operate the transmission speed ratio control element which has been selected by longitudinal movement of rod 16.

Rod 16 may be rotatably and slidably mounted adjacent its lower end to accommodate its rotary and longitudinal movements as in the bracket 21 fixed to the steering post 15. A spring 22 surrounding rod 16 and reacting against bracket 21 may be utilized to urge rod 16 to its lowermost position.

My novel mechanism to transmit rotation of rod 16 to rotation of lever 20 will now be described. A lever 23 illustrated as having a crescent shape to avoid interference with steering post 15 is keyed to the lower portion of rod 16. A downwardly extending rod 24 is rotatably mounted on the free end of lever 23 and is adapted to be raised or lowered as lever 23 is rotated with rod 16. A shaft 25 is rotatably mounted on one side of the engine transverse to the vehicle and has one end thereof pivotally mounted on the frame and the other end pivotally mounted on the power plant so that rotation on its longitudinal axis is possible. A crank arm 26 on the shaft 25 adjacent the frame pivotal mounting has rod 24 pivoted thereon so that upward and downward movement of rod 24 rotate crank arm 26 and shaft 25. Shaft 25 has a second crank arm 27 on the side thereof adjacent the power plant and opposite the crank arm 26. A rod 28 connects crank arm 27 and transmission lever 20 so that rotation of shaft 25 and crank arm 27 induces longitudinal movement in rod 28 which rotates transmission lever 20. Shaft 25 has been illustrated as having a depressed central portion to avoid interference with the brake pedal when the latter is actuated.

The shaft 25 is preferably mounted as shown on ball joints. Frame mounted bracket 30 carries ball 31. Shaft 25 has a cylindrical opening 32 in which a socket member 33 is retained by snap ring 34. Socket member 33 has a spherical recess 35 therein which receives ball 31. At its inner end shaft 25 is journalled on ball 36 carried by bracket 37 which is in turn fastened to the clutch housing 12. A cylindrical opening 39 formed in shaft 25 slidably receives a socket member 40 which has a spherical opening 41 adapted to receive ball 36. Lateral movement of the power plant relative to the frame 10 is taken up in movement of socket member 40 in opening 39. Opening 39 is sufficiently deep to retain socket member 40 therein within the limits of relative movement of power plant and frame.

Rotation of rod 16 is transmitted to transmission lever 20 by lever 23, rod 24, crank arm 26, shaft 25, crank arm 27, and rod 28. It is evident that the power plant may have a wide range of movements relative to the frame without changing the position of the control lever 17. Lateral movement of the power plant relative to the frame is taken care of by the sliding of socket member 40 in cylindrical opening 39 thereby changing the effective length of shaft 25. Longitudinal movement of the power plant relative to the frame moves ball 36 and transmission lever 20 together. An angular movement of shaft 25 in a horizontal plane occurs through the movement of ball 36 in its socket, the turning of shaft 25 about ball 31 and this is accommodated by the sliding movement of socket member 40 in opening 39. The stationary point relative to which these movements have occurred is contained in ball 31. Since crank arm 26 is close to ball 31 the motion is not transmitted to shift control lever 17. Vertical movement of the power plant and rotation of the power plant relative to the frame impart similar motion to the components although in different planes.

I claim:

1. In a motor vehicle, a frame and body assembly, a power unit including a variable speed ratio transmission mounted for movement relative to said frame and body assembly, means mounted within said frame and body assembly for changing the speed ratio drive in said transmission, a control member mounted for movement on said assembly, a U-shaped shaft located in close proximity to said member and having opposed leg portions and a connecting bight portion for accommodating movement of said control member between said leg portions, said shaft being supported at one end for universal movement by said power unit and supported at its other end for universal movement by said frame and body assembly, said means being adapted to rotate said shaft about one axis when actuated by the vehicle driver and a second means to transmit rotation of said shaft to said transmission to effect a change in speed ratio drive therein.

2. In a motor vehicle, a frame and body assembly, a power unit including a variable speed ratio transmission mounted for movement relative to said frame and body assembly, means mounted within said frame and body assembly for changing the speed ratio drive in said transmission, a control member mounted for movement on said assembly, a U-shaped shaft located in close proximity to said member and having opposed leg portions and a connecting bight portion for accommodating movement of said control member between said leg portions, a universal joint support for one end of said shaft on said power unit and a universal joint support for the other end of said shaft on said frame and body assembly, a second means to accommodate changes in the distance between said supports, an operative connection of said shaft and said first means within the frame and body assembly and an operative connection between said shaft and said transmission whereby said shaft transmits motion to effect a change in transmission speed ratio drive and movement of said universal joint supports and said second means accommodates relative movement of said power plant and frame and body assembly without moving said first means relative to said frame and body assembly.

3. In a motor vehicle, a frame and body assembly, a power unit including a variable speed ratio transmission mounted for movement relative to said frame and body assembly and having a pair of shift rails a means for controlling the speed ratio drive in said transmission comprising a rod penetrating the operator's compartment of the vehicle and adapted for rotation and reciprocation, a first control element on said transmission adapted to select one of said rails and a second control element adapted to shift said selected first rail, a shaft, a support for said shaft on said frame and body assembly, a second means connecting said power unit and said shaft for rotating said shaft on a first axis normal thereto and in said support in response to movement of said power unit, a crank arm on said shaft adjacent said support, an operative connection between said crank arm and said rod whereby rotation of said rod rotates said shaft on a second axis normal to said crank arm, an operative connection between said second control element and said shaft adjacent said second means, and a control means operatively connecting said rod and said first control element independently of said shaft and adapted to be actuated during said reciprocation of said rod.

JAY C. AUTEN.

REFERENCES CITED

The following references are of record in the file of this patent:

UNITED STATES PATENTS

| Number | Name | Date |
| --- | --- | --- |
| 2,302,901 | Wahlberg | Nov. 24, 1942 |